United States Patent
Shahar et al.

(10) Patent No.: US 9,743,220 B2
(45) Date of Patent: Aug. 22, 2017

(54) ADAPTIVE FREQUENCY HOPPING (AFH) WITH CHANNEL INHIBITION (CI) FOR BLUETOOTH

(71) Applicant: Intel IP Corporation, Santa Clara, CA (US)

(72) Inventors: Itzik Shahar, Kadima (IL); Hsin-Yi Kao, Santa Clara, CA (US); Brian J. Sublett, Menlo Park, CA (US); Ofer Hareuveni, Haifa (IL); Hakan Magnus Eriksson, Hillsboro, OR (US); Dongsheng Bi, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 29 days.

(21) Appl. No.: 14/749,812

(22) Filed: Jun. 25, 2015

(65) Prior Publication Data
US 2016/0381572 A1    Dec. 29, 2016

(51) Int. Cl.
*H04B 7/00* (2006.01)
*H04W 4/00* (2009.01)
*H04W 74/08* (2009.01)
*H04W 84/20* (2009.01)

(52) U.S. Cl.
CPC ........... *H04W 4/008* (2013.01); *H04W 74/08* (2013.01); *H04W 84/20* (2013.01)

(58) Field of Classification Search
CPC ..... H04W 24/02; H04W 24/10; H04W 4/008; H04W 72/0453; H04W 84/20
USPC ........................................................ 455/41.2
See application file for complete search history.

(56) References Cited

U.S. PATENT DOCUMENTS

7,103,030 B2    9/2006  Jones
7,532,610 B2    5/2009  Batra

*Primary Examiner* — Eugene Yun
(74) *Attorney, Agent, or Firm* — Eschweiler & Potashnik, LLC (57) ABSTRACT

Techniques for employing channel inhibition (CI) with adaptive frequency hopping (AFH) in connection with Bluetooth (BT) are discussed. One example system employing such techniques comprises a BT master component operating on a plurality of channels via AFH; and a processor configured to: assign, based on a set of criteria, a first (e.g., 'UNUSED') status and a priority level to one or more channels, and a second (e.g., 'USED') status to each other channel; determine whether a total number of channels set as 'USED' is less than a minimum number of required channels; and in response to a determination that the total number of channels set as 'USED' is less than the minimum number, repeatedly assign a 'USED' status to a channel having a lowest priority level among channels with the 'UNUSED' status, until the total number of channels set as 'USED' equals the minimum number.

20 Claims, 8 Drawing Sheets

ADAPTIVE FREQUENCY HOPPING (AFH) WITH CHANNEL INHIBITION (CI) FOR BLUETOOTH

FIELD

The present disclosure relates to techniques to optimize the performance of Bluetooth technology with other wireless technology operating in the same frequency bands.

BACKGROUND

A Bluetooth (BT) device in a BT connection that has Adaptive Frequency Hopping (AFH) enabled periodically performs channel estimation on all the BT channels. Based on the periodic channel estimation, a BT device in a master role determines the BT channels to be used by the BT connection (e.g., via an AFH map denoting channels as 'USED' or 'UNUSED') to ensure that channels with poor quality are not used ('UNUSED') and that there are at least a minimum required number of BT channels in use ('USED') per the BT specification. A BT device in a slave role reports the result of channel estimation (e.g., as a channel classification of 'GOOD,' 'BAD,' or 'UNKNOWN') to the BT master, in order to reduce the likelihood that the BT master will use channels reported by the BT slave as BAD channels, and increase the likelihood that the BT master will block those channels.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

Embodiments described herein can employ techniques at Bluetooth (BT) master or BT slave components that can facilitate improved simultaneous operation of Bluetooth technology with other collocated technology operating on the same frequency band(s) as the Bluetooth technology. In Adaptive Frequency Hopping (AFH), a Bluetooth (BT) slave component can report channel classification results (e.g., as 'GOOD,' 'BAD,' or 'UNKNOWN') to a BT master component as 'BAD' for at least one channel, in order to reduce the likelihood the BT master will use those channels (e.g., by blocking the channels, etc.). In AFH, instead of just hopping between each of the available channels of the plurality of channels, a BT master can block (e.g., set as 'UNUSED') some of the plurality channels (e.g., due to poor signal quality from interference, etc.), allowing for theoretically greater throughput on the remaining channels, while maintaining the number of unblocked channels (those set as 'USED') as no less than a minimum number of required channels for operation (e.g., 20).

However, a BT master may use (unblock) the 'BAD' channels that the BT slave absolutely doesn't want to use, for example, BT channels that are overlapped with a collocated wireless component (e.g., WiFi, LTE (Long Term Evolution), etc.). This is because the radio frequency (RF) signal from the collocated wireless is strong enough that it will greatly impact all of the BT channels and, based on the channel quality information collected for channel estimation, the BT slave may report most of the channels as BAD, which can cause the number of 'BAD' channels to be high enough that there are less than the minimum number of required channels not reported as 'BAD.' As a result, the BT master can end up unblocking a 'BAD' channel that happens to be a BT slave's worst channel (e.g., a center frequency of a collocated wireless component). As a consequence, performance of both the BT and collocated wireless connections can be significantly degraded.

However, in various embodiments disclosed herein, the chance of a BT master unblocking a BT channel being used by a collocated additional wireless component (e.g., WiFi, LTE, etc.) of the BT master or of the BT slave can be minimized via one or more techniques described herein. Techniques described herein can also reduce the time required for a BT master to converge to an optimal set of channels.

In BT slave aspects, interference can be minimized via reporting only those channels known to be used by the collocated wireless component as 'BAD.' In contrast, conventional techniques involving a collocated Bluetooth and other wireless component operating at the same time in a BT slave have a substantially higher probability of the BT master component unblocking channels employed by the collocated wireless component. This can result in throughput degradation of both the BT connection and the other wireless connection, as the BT and other wireless (e.g., WiFi) connections transmit and receive on the overlapping channels, and thus have to share resources for accessing radio frequency, such as in a time division manner.

However, in accordance with aspects described herein, the BT master can mostly (or completely) block the channels being used by the BT slave's collocated wireless component, allowing the BT and other wireless connections to separately operate in separate channels. Test results conducted in connection with this disclosure have shown significant improvements in the throughput of both the BT and other wireless (e.g., WiFi, etc.) connections.

Having the collocated additional wireless component (e.g., WiFi, etc.) provide the BT component a channel map that tells the BT component which channels are used by the collocated additional wireless (e.g., WiFi, LTE, etc.) component (e.g, via an out-of-band channel, etc.). This channel map can be a WiFi, etc. Channel Inhibition (CI) Map in a memory shared between the BT component and additional wireless component, so that before the channel estimation is completed, the channel(s) used by additional wireless component are known to the BT component.

As a BT slave, as soon as the CI map from the additional wireless (e.g., WiFi, etc.) component is known, the channel classification can be reported, with only the channels used by the additional wireless (e.g., WiFi, etc.) component marked as 'BAD.' The rest of the channels can be reported either 'GOOD' if the quality measurement result indicates so or 'UNKNOWN' in other situations. The same mechanism can be employed in subsequent periodic channel classifications until the CI map from the additional wireless component is updated.

Figure 1:
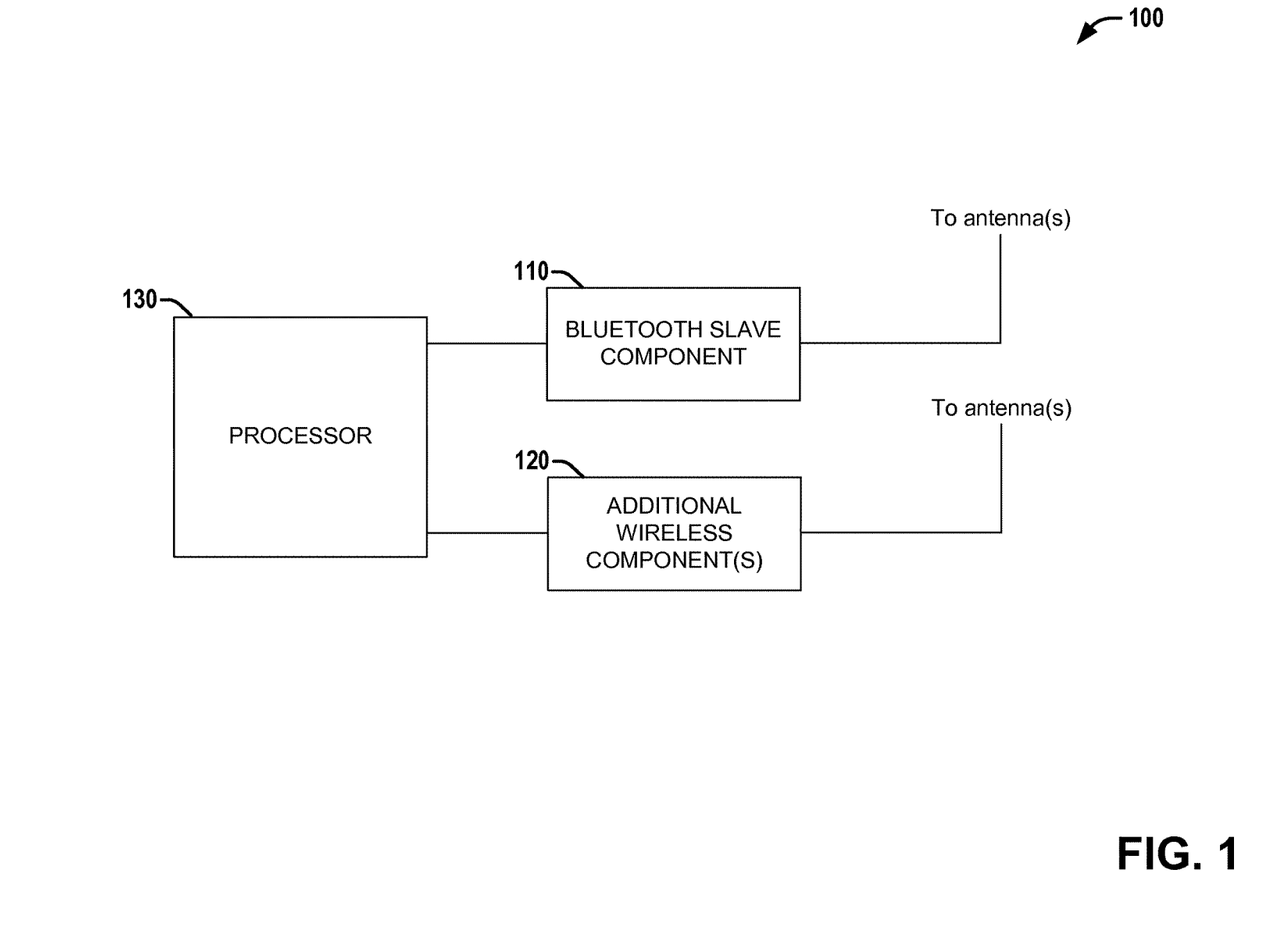
FIG. 1 is a block diagram of an example system that facilitates BT channel classification in connection with a BT slave according to aspects described herein

Referring to FIG. 1, illustrated is a block diagram of an example system 100 that facilitates BT channel classification in connection with a BT slave according to aspects described herein. System 100 can facilitate improved operation of a BT component collocated with an additional wireless component. System 100 can be located, for example in a user equipment (UE) or other device capable of operating as a BT slave. System 100 includes a BT slave component (or BT master component configured to operate in a BT slave mode) 110, one or more additional wireless components (e.g., WiFi, LTE, etc.) 120, and a processor 130.

BT slave component 110 is configured to operate according to an Adaptive Frequency Hopping (AFH) Bluetooth mode of operation as a BT slave component, communicating with a BT master component via a plurality of channels (e.g., 79 individual 1 MHz channels in the 2.4 GHz band).

Additional wireless component(s) 120 can operate according to some wireless communications protocol that also potentially operates on one or more of the plurality of channels (e.g., WiFi, unlicensed band LTE operation, etc.). In general, wireless component 120 can operate on some (e.g., a first subset) of the plurality of channels, and not operate on some other (e.g., a second subset) of the plurality of channels. Additionally, additional wireless component 120 can provide channel inhibition (CI) map(s) to the BT slave component 110 and/or processor 130, indicating the channels (e.g., first subset) that each additional wireless component 120 is configured to operate on.

Processor 130 can receive the CI map(s) from the additional wireless component(s) 120, indicating the channels (e.g., first subset) that the additional wireless component(s) 120 is/are configured to operate on. Based on the CI map(s), processor 130 can assign a 'BAD' channel estimate to each channel the additional wireless component(s) 120 is/are configured to operate on.

Additionally, based on data received via BT slave component 110, processor can perform channel estimation on the remaining channels of the plurality of channels (or each of the plurality of channels), obtaining channel estimation results for each channel not already assigned a 'BAD' channel estimate based on the CI map(s) (or for each channel). Based on the channel estimation results, processor 130 can assign a 'GOOD' or 'UNKNOWN' channel estimate to each channel not already assigned a 'BAD' channel estimate (i.e., the channels indicated in the CI map from the additional wireless component 120). The channel estimates can be based on a combination of a Received Signal Strength Indicator (RSSI) and a Packet Error Rate (PER), or on only one of RSSI or PER, etc. Processor 130 can assign a 'GOOD' channel estimate in circumstances similar to conventional AFH systems, namely, when sufficient channel quality information for the channel can be obtained, and the channel conditions do not indicate the channel is 'BAD' (e.g., based on threshold values). However, processor 130 can assign an 'UNKNOWN' channel estimate to channels both with poor channel estimation results that would conventionally be assigned a 'BAD' estimate, as well as to channels with insufficient channel quality information (which would also be assigned an 'UNKNOWN' status in conventional systems).

Figure 2:
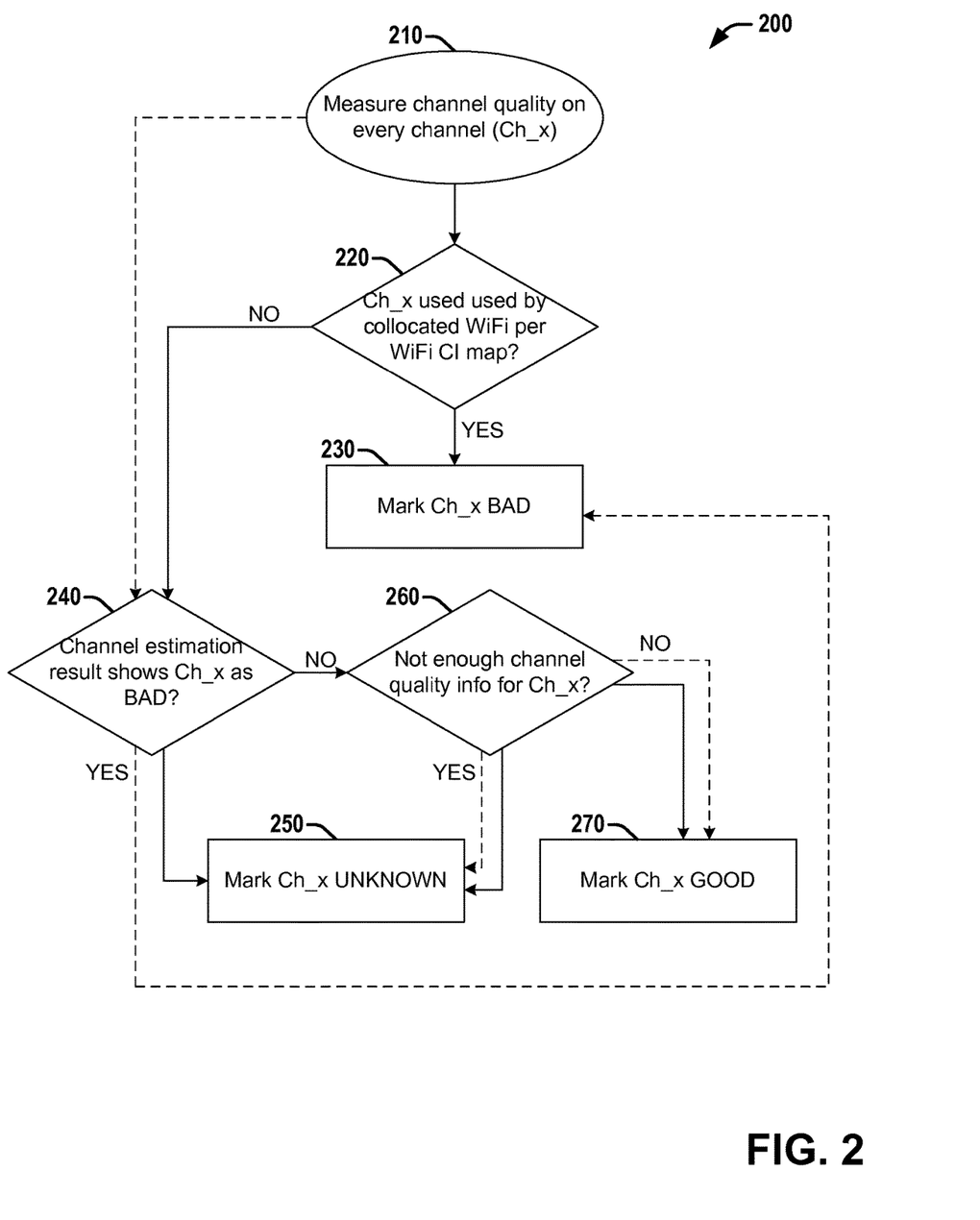
FIG. 2 is a flow chart of a method of channel classification that optimizes performance of a BT slave component collocated with an additional wireless component according to aspects described herein.

Referring to FIG. 2, illustrated is a flow diagram of a method 200 of channel classification that optimizes performance of a BT slave component collocated with an additional wireless component according to various aspects described herein. FIG. 2 illustrates a comparison between channel classification from a BT slave component according to aspects described herein, and classification according to conventional techniques. In FIG. 2, the solid lines indicate the flow of method 200, according to techniques described herein, while the dashed lines indicate the flow of a conventional method of BT slave channel classification.

At 210, the channel quality of each channel (or, in aspects, each channel not included on a CI map of a collocated additional wireless component) can be measured.

For each channel Ch_x, a determination can be made at 220 as to whether the channel is used by the collocated additional wireless (e.g., WiFi, etc.) component(s) (e.g., per the CI map(s)).

If the channel is used by the collocated additional wireless component(s), then at 230, the channel Ch_x can be marked with a 'BAD' channel estimate, to reduce the likelihood the BT master will unblock that channel, by only designating the worst channels (those on which the collocated additional wireless component actually operates) as 'BAD.'

If the channel is not in the CI map(s), then at 240, a determination can be made as to whether the channel estimation result shows that channel as 'BAD' (e.g., based on threshold value(s), etc.).

If the channel estimation results indicate the channel as 'BAD,' the channel can be marked 'UNKNOWN' at 250.

If the channel estimation results do not indicate a 'BAD' channel quality, then at 260, a determination can be made at 260 as to whether there is sufficient channel quality information (e.g., based on threshold value(s), etc.).

If there is insufficient channel quality information, the channel can be marked as 'UNKNOWN' at 250, while if there is sufficient channel quality information, the channel can be marked as 'GOOD' at 270.

In contrast, in conventional techniques, no CI map is received and no determination is made based on it. Instead, after measuring channel quality at 210, a determination is made at 240 as to whether the channel estimation result shows 'BAD' (in which case the channel is marked as 'BAD' at 230) or not (in which case a determination of whether there is sufficient channel quality information is made at 260). If there is insufficient channel quality information, the channel is marked 'UNKNOWN' at 250, but if there is sufficient channel quality information, the channel is marked 'GOOD' at 270. Because of the interference from the collocated additional wireless component, not only will the channels actually used by the collocated additional wireless component be marked as 'BAD,' but additional channels near those channels will be marked as 'BAD' (and potentially other channels, as well). However, by marking so many channels as 'BAD,' conventional techniques increase the likelihood of one or more of the worst channels (e.g., one of the channels actually used by the collocated additional wireless component) being unblocked by a BT master.

Figure 3:
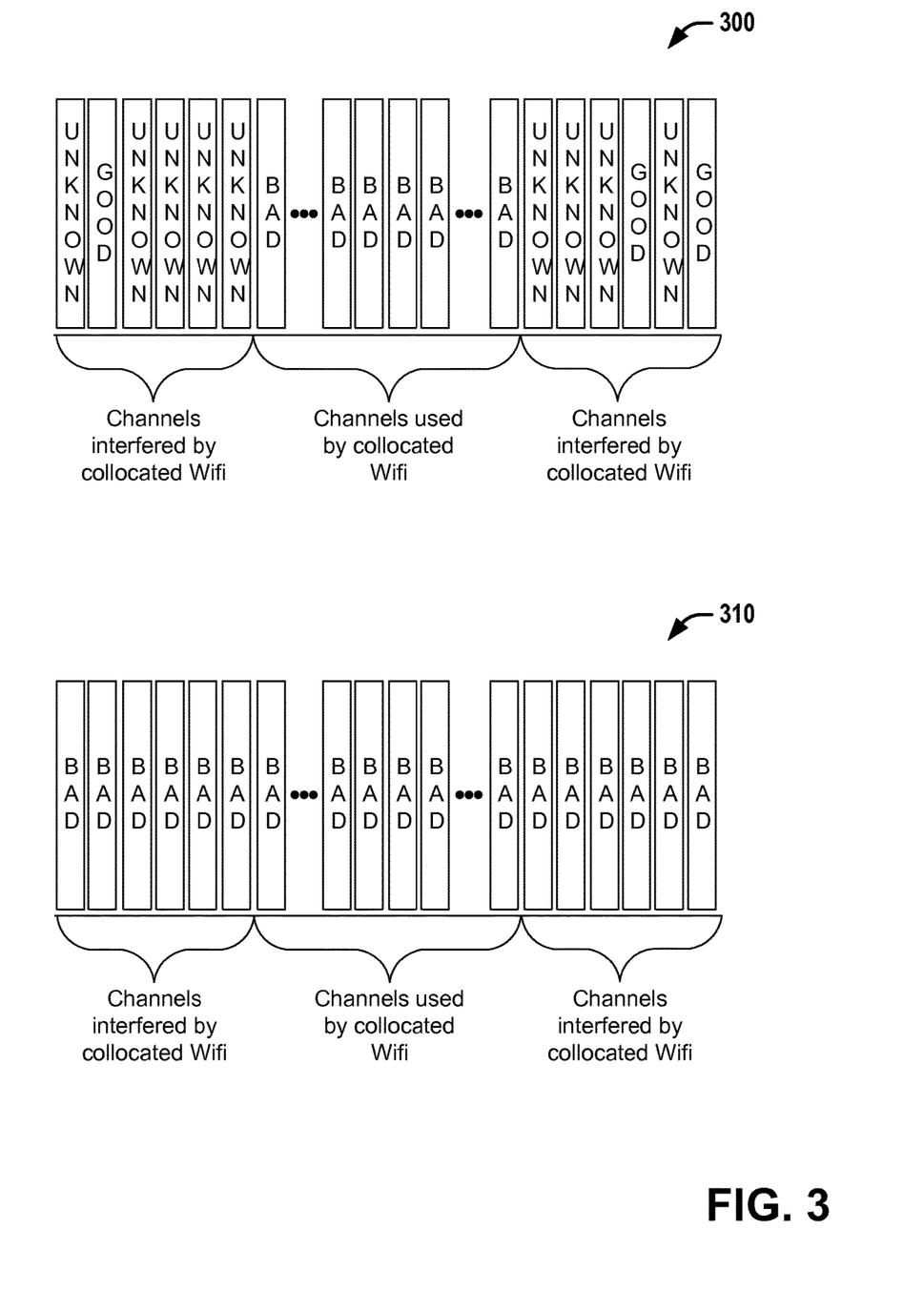
FIG. 3 is a diagram of example channel classification maps from a BT slave device employing techniques disclosed herein and from a BT slave device employing conventional techniques.

Referring to FIG. 3, illustrated are example channel classification maps from a BT slave device employing techniques disclosed herein at 300, and from a BT slave device employing conventional techniques. As can be seen at 300, only the channels actually used by the collocated additional wireless component(s) (in this case, WiFi) are marked as 'BAD,' with all other channels marked as 'GOOD' or 'UNKNOWN.' In contrast, conventional techniques will lead to marking as 'BAD' not just the channels used by the collocated additional wireless component(s), but also channels interfered by the collocated additional wireless device, providing no information to the BT master as to which of these channels are the worst channels for the BT slave, as seen in the example channel map at 310.

Additionally, as described in greater detail herein, BT master devices can set different priorities to the BT channels marked 'UNUSED' depending on the reason for marking the channel 'UNUSED,' which can be employed in selected which 'UNUSED' channel(s) to unblock. The BT master can unblock (set as 'USED') channels based on both channel quality and priority. For example, a channel set 'UNUSED' due to a BT slave's channel classification report can be set to a higher priority than one set 'UNUSED' based on the BT master's local channel classification, to avoid unblocking channels used by a BT slave's collocated additional wireless (e.g., WiFi, etc.) component(s) as much as possible.

Figure 4:
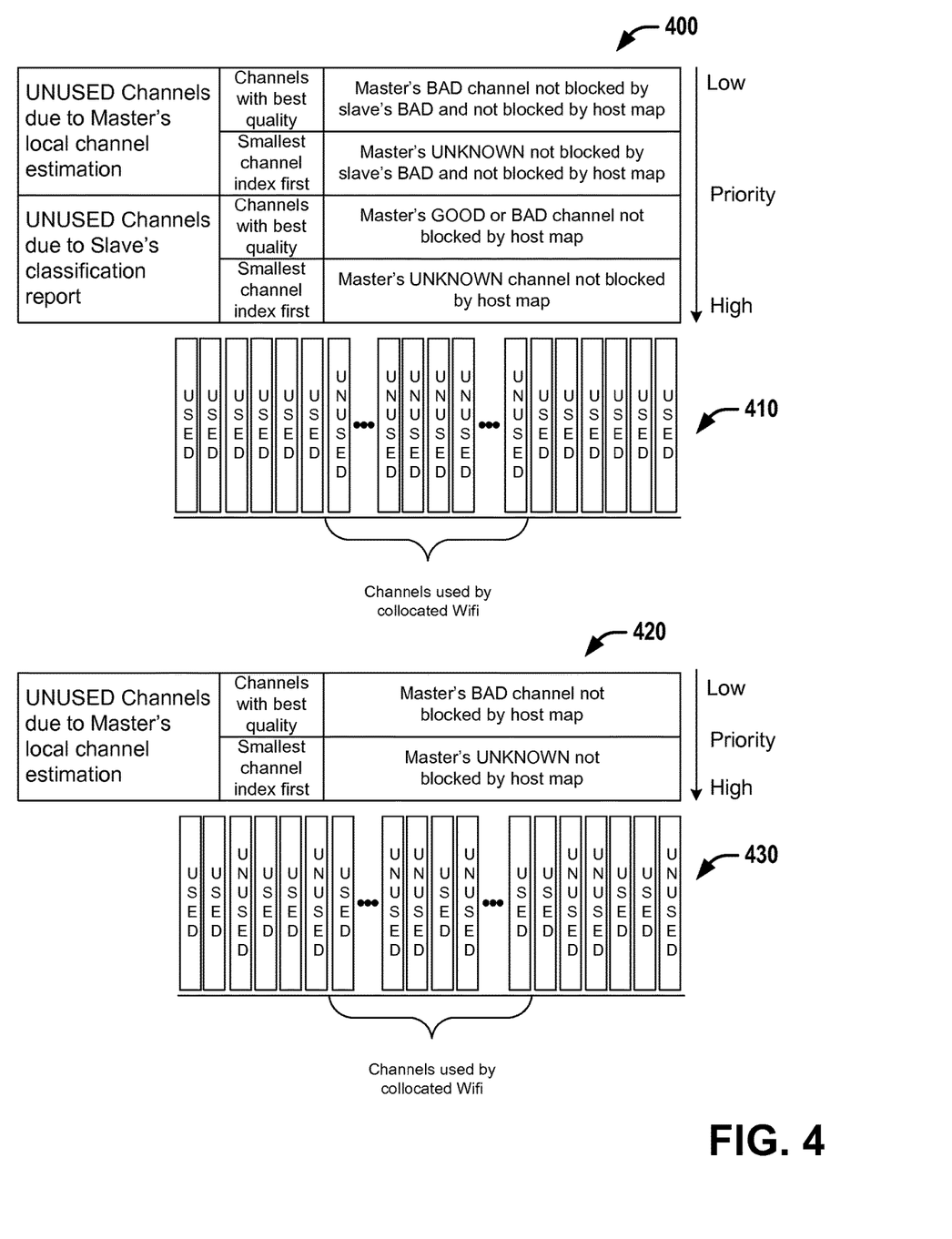
FIG. 4 is a diagram of prioritizations of BT master and BT slave channel classifications according to aspects described herein at and according to conventional aspects, as well as example channel use maps resulting from techniques described herein and from conventional techniques.

Referring to FIG. 4, illustrated are prioritizations of BT master and BT slave channel classifications according to aspects described herein at 400 and according to conventional aspects at 420, as well as example channel use maps resulting from techniques described herein at 410 and from conventional techniques at 430. As can be seen at 400, instead of just unblocking channels based on local channel classification from the BT master, a higher priority can be given to channels blocked (set as 'UNUSED') based on channel classification reports received from BT slaves (which can indicate as 'BAD' only those channels used by collocated wireless components, as described herein). As seen at 400, channels set 'UNUSED' based on BT slave channel classification reports can remain 'UNUSED' until all channels with a lower priority are already unblocked. As a result, as in the example channel map at 410, the channels used by collocated wireless components of BT slaves are less likely to be unblocked (i.e., set as 'USED'). In contrast, in conventional systems, BT slave channel classifications are not given a higher priority as seen at 420, and as a result, the BT master will unblock channels used by collocated wireless component(s) of BT slaves based on its own channel classification, as seen in the example channel map at 430.

Figure 5:
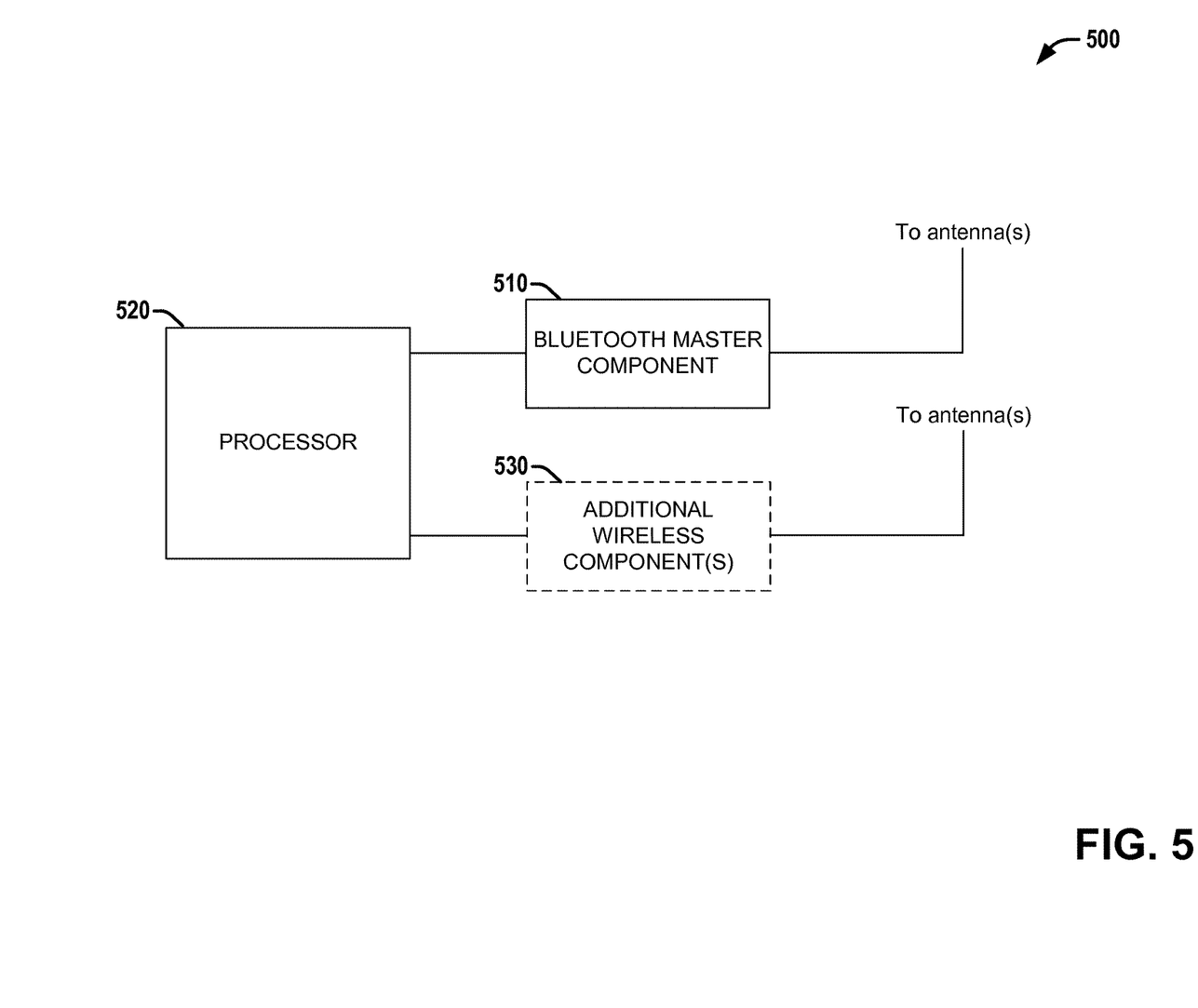
FIG. 5 is a block diagram of an example system that facilitates BT channel selection in connection with a BT master according to aspects described herein.

Referring to FIG. 5, illustrated is a block diagram of an example system 500 that facilitates BT channel selection in connection with a BT master according to aspects described herein. System 500 can facilitate improved operation of a BT component collocated with an additional wireless component. System 500 can be located, for example in a user equipment (UE) or other device capable of operating as a BT master. System 500 includes a BT master component 510, optionally one or more additional wireless component(s) (e.g., WiFi, LTE, etc.) 520, and a processor 530.

BT master component 510 is configured to operate according to an Adaptive Frequency Hopping (AFH) Bluetooth mode of operation as a BT master component, communicating with one or more BT slave components via a subset (e.g., some or all) of a plurality of channels (e.g., 79 individual 1 MHz channels in the 2.4 GHz band), with that subset referred to herein as 'USED' channels. As part of the communication with the one or more BT slave components, BT master component 510 can receive channel classification report(s) (e.g., periodically) from each of the one or more BT slave components, indicating channel classifications based on local estimations at that BT slave component (e.g., 'GOOD,' 'BAD,' or 'UNKNOWN'), which can be as described herein (e.g., with 'BAD' only when the channel is used by a collocated additional wireless component). As the subset of 'USED' channels changes, BT master component can indicate a new frequency hopping sequence to the one or more BT slaves.

Additional wireless component(s) 520, when included, can operate according to some wireless communications protocol that also potentially operates on one or more of the plurality of channels (e.g., WiFi, unlicensed band LTE operation, etc.). In general, each additional wireless component 520 can operate on some (e.g., a first subset) of the plurality of channels, and not operate on some other (e.g., a second subset) of the plurality of channels. Additionally, additional wireless component(s) 520 can provide channel inhibition (CI) map(s) to the BT master component 510 and/or processor 530, indicating the channels (e.g., first subset) that each additional wireless component 520 is configured to operate on.

Processor 530 can block (set as 'UNUSED') some of the plurality of channels based on various criteria (Host channel map, Long Term Evolution (LTE) CI map, the CI map(s) from additional wireless component(s) 520 in aspects including additional wireless component(s) 520, BT slave channel classification reports, and local channel estimation performed by processor 530 based on channels as measured by BT master component 510). Processor 530 can set each other channel (those not set 'UNUSED' based on any criterion) to the 'USED' status.

Processor 530 can assign a priority level to each channel set as 'UNUSED,' based on the criteria that caused it to be set 'UNUSED.' In situations wherein more than one priority level applies, processor 530 can assign the highest applicable priority level. Channels set as 'UNUSED' based on the Host channel map can receive the highest priority level. The second highest priority level can be assigned to channels set as 'UNUSED' based on an LTE CI map indicating channels used by an LTE component (not shown). The third highest priority level can be assigned to channels set as 'UNUSED' based on the CI map(s) of the additional wireless component(s) 520 in aspects including additional wireless component(s) 520. The fourth highest priority level can be assigned to channels set as 'UNUSED' based on channel classification reports received from the one or more BT slave components (which can designate channels used by collocated wireless components via the 'BAD' status, as discussed herein). The fifth highest (e.g., lowest) priority level can be assigned to channels set as 'UNUSED' based on local channel estimation by processor 530 (e.g., based on at least one of RSSI and PER).

Processor 530 can compare a total number of 'USED' channels to a minimum required number of 'USED' channels (e.g., per a standard, etc., such as 20 channels, etc.) to determine whether to unblock one or more channels previously set as 'UNUSED.' If there are insufficient 'USED' channels, processor 530 can set one or more channels to 'USED' based on the priority levels and additional factors for each priority level. Each channel selected to be set to 'USED' can have the lowest priority level among channels currently set to 'UNUSED,' and can be selected based on other factors to improve the likelihood that better channels are unblocked earlier.

If there are any channels set as 'UNUSED' based on local channel estimation, these channels can be unblocked first, with channels selected for unblocking based on distance from the channels in the CI map(s) of the additional wireless component(s) 520 (or, in aspects not including additional wireless component(s) 520, selecting the best RSSI and/or PER channel, or based on distances from other CI maps or channel maps), such that channels that are farther away are unblocked before closer channels. If there are no channels set as 'UNUSED' based on local channel estimation but there are channels set as 'UNUSED' based on received slave channel classification reports, these channels can be unblocked, with channels selected for unblocking based on distance from the channels in the CI map(s) of the additional wireless component(s) 520 (or, in aspects not including additional wireless component(s) 520, selecting the best RSSI and/or PER channel, or based on distances from other CI maps or channel maps), such that channels that are farther away are unblocked before closer channels. If there are no channels set as 'UNUSED' based on local channel estimation or received slave channel classification reports but there are channels set as 'UNUSED' based on the CI map(s) of the additional wireless component(s) 520, these channels can be unblocked, with channels selected for unblocking based on distance from the channels in the LTE CI map, such that channels that are farther away are unblocked before closer channels. If there are no channels set as 'UNUSED' based on local channel estimation, received slave channel classification reports, or the CI map(s) of the additional wireless component(s) 520, but there are channels set as 'UNUSED' based on the LTE CI map, these channels can be unblocked, with channels selected for unblocking based on distance from the center frequency of the LTE CI map, such that channels that are farther away are unblocked before closer channels. If the only channels set as 'UNUSED' are those set based on the host channel map, these channels can be unblocked, with channels selected for unblocking based on any of a variety of selection factors (e.g., smallest or largest channel index first, best RSSI/PER, etc.). Once sufficient channels are unblocked to have at least the minimum number of required 'USED' channels, no more channels need to be unblocked.

In situations where collocated additional wireless component(s) 520 (e.g., WiFi, LTE, etc.) is/are operating on the same RF (Radio Frequency) band or an adjacent band to that used by BT master component 510, making the BT channel selection based on only the channel estimation data such as RSSI (Received Signal Strength Indicator) and/or PER (Packet Error Rate), as done conventionally, may result in a worse BT channel being unblocked (set as 'USED') while leaving better ones blocked, because the measured RSSI/PER can be so contaminated due to the signal from the collocated additional wireless component(s) 520, which can be strong enough to impact all the BT channels.

Compare to making channel selection based on contaminated channel estimation data such as RSSI and PER (as in conventional techniques), channel selection techniques according to aspects described herein work in a more predictable way, so that the BT channels truly interfered the most by collocated wireless component(s) 520 are avoided (set as 'UNUSED') as much as possible. Because of this, a better overall throughput is achieved in situations wherein multiple different wireless components are collocated and/or co-existing.

Figure 6:
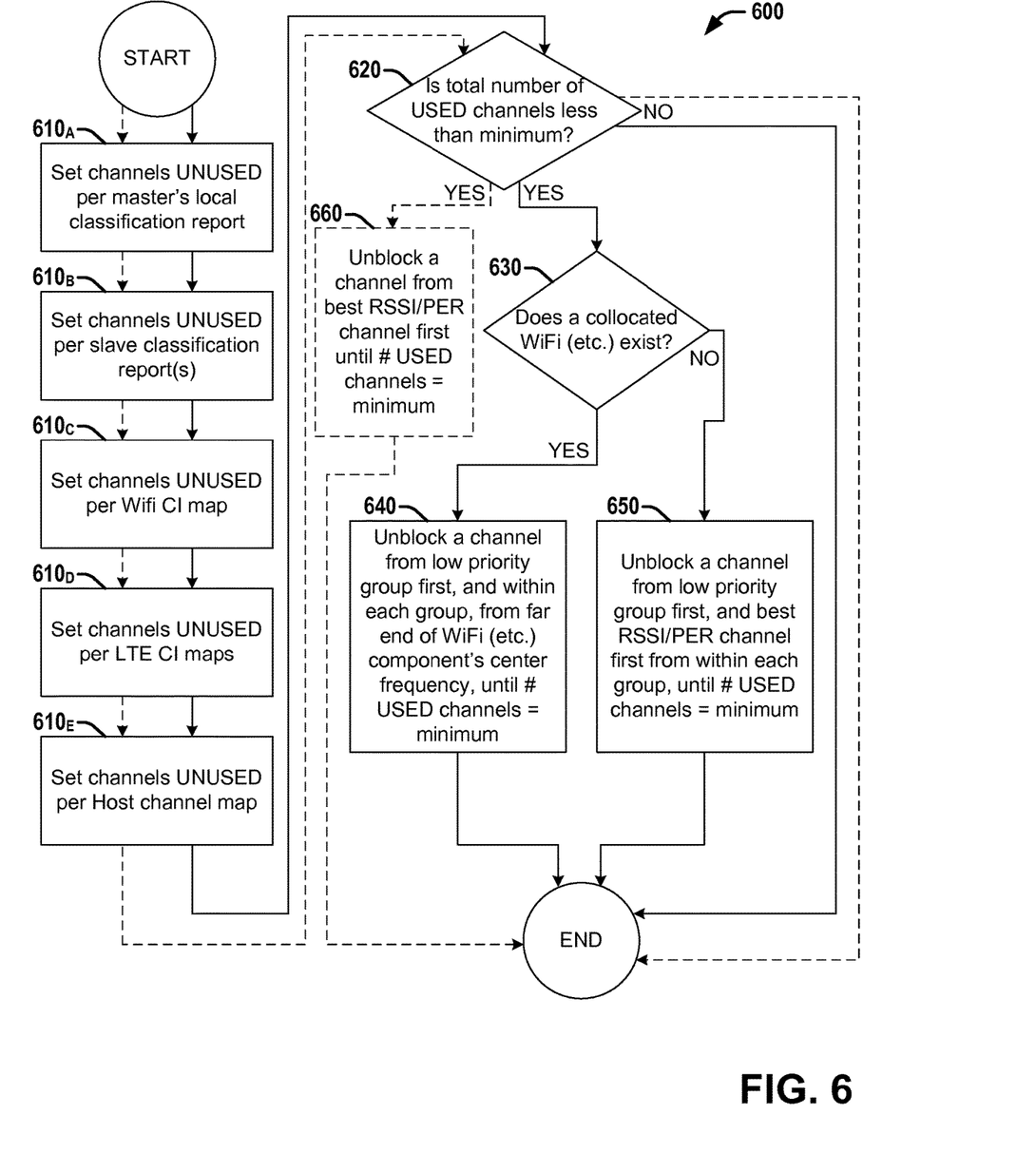
FIG. 6 is a flow diagram of an example method of channel selection that optimizes performance of a BT master component co-existing with additional wireless connections according to various aspects described herein.

Referring to FIG. 6, illustrated is a flow diagram of a method 600 of channel selection that optimizes performance of a BT master component co-existing with additional wireless connections according to various aspects described herein. FIG. 6 illustrates a comparison between channel selection from a BT master component according to aspects described herein, and selection according to conventional techniques. In FIG. 6, the solid lines indicate the flow of method 600, according to techniques described herein, while the dashed lines indicate the flow of a conventional method of BT master channel selection.

At $610_A$ through $610_E$, one or more channels can be set as 'UNUSED' based on a variety of criteria, each of which is associated with (in techniques described herein) a different priority level. Channels can be set 'UNUSED' based on the following criteria (with associated priority levels, wherein each 'UNUSED' channel has a highest priority level among priority levels associated with criteria based on which it was blocked): at $610_A$, channels can be set 'UNUSED' based on local channel estimation, associated with a fifth highest priority level; at $610_B$, channels can be set 'UNUSED' based on received slave channel classification reports, associated with a fourth highest priority level; at $610_C$, channels can be set 'UNUSED' based on CI map(s) of collocated additional wireless component(s), associated with a third highest priority level; at $610_D$, channels can be set 'UNUSED' based on an LTE CI map of a collocated LTE component, associated with a second highest priority level; and at $610_E$, channels can be set 'UNUSED' based on a host channel map, associated with a highest priority level. The remaining channels not set to the 'UNUSED' status can be assigned the 'USED' status for use in BT communication by the BT master component and BT slave component(s).

At 620, a determination can be made as to whether the total number of 'USED' channels is less than a minimum required number of 'USED' channels (e.g., as determined by a standard, e.g., 20, etc.). If there are already sufficient 'USED' channels, no channels need to be unblocked, although method 600 can be repeated when one or more of the criteria in $610_A$ through $610_E$ change.

In the event there are insufficient 'USED' channels, channels can be unblocked according to various techniques described herein, which can depend, as indicated at 630, on whether there is a collocated additional wireless component that can interfere with the BT master component.

If there is at least one collocated additional wireless component, at 640, channels can be unblocked as described herein based on selecting sufficient individual 'UNUSED' channels from the lowest priority level of 'UNUSED' channels, with selection in that priority level based on a distance from the CI map(s) or CI map center frequency/frequencies of the collocated additional wireless component(s) for the lowest two priority levels, from the LTE CI map for the third highest priority level, from the LTE center frequency for the second highest priority level, and based on any of a variety of factors for the highest priority level (e.g., smallest/largest channel index first, etc.). The unblocking at 640 can be repeated until there are sufficient 'USED' channels (e.g., equal to the minimum required number).

If there is no collocated additional wireless component, at 650, channels can be unblocked as described herein based on selecting sufficient individual 'UNUSED' channels from the lowest priority level of 'UNUSED' channels, with selection in that priority level based on selecting the best RSSI and/or PER channel first and/or based on a distance from the LTE CI map or center frequency for lower priority levels, and based on any of a variety of factors for the highest priority level (e.g., smallest/largest channel index first, etc.). The unblocking at 650 can be repeated until there are sufficient 'USED' channels (e.g., equal to the minimum required number).

Once sufficient channels have been unblocked, no additional channels need to be unblocked, although method 600 can be repeated when one or more of the criteria in $610_A$ through $610_E$ change.

In contrast, in conventional channel selection, after assigning the 'UNUSED' status to channels based on criteria indicated at $610_A$ through $610_E$, if additional channels need to be unblocked as determined at 620, at 660 channels are simply unblocked based on the best RSSI and/or PER channel being selected first. However, this can cause channels that are heavily interfering to be selected before other channels that may be better, for example, selection of channels used by collocated additional wireless component(s), etc.

Figure 7:
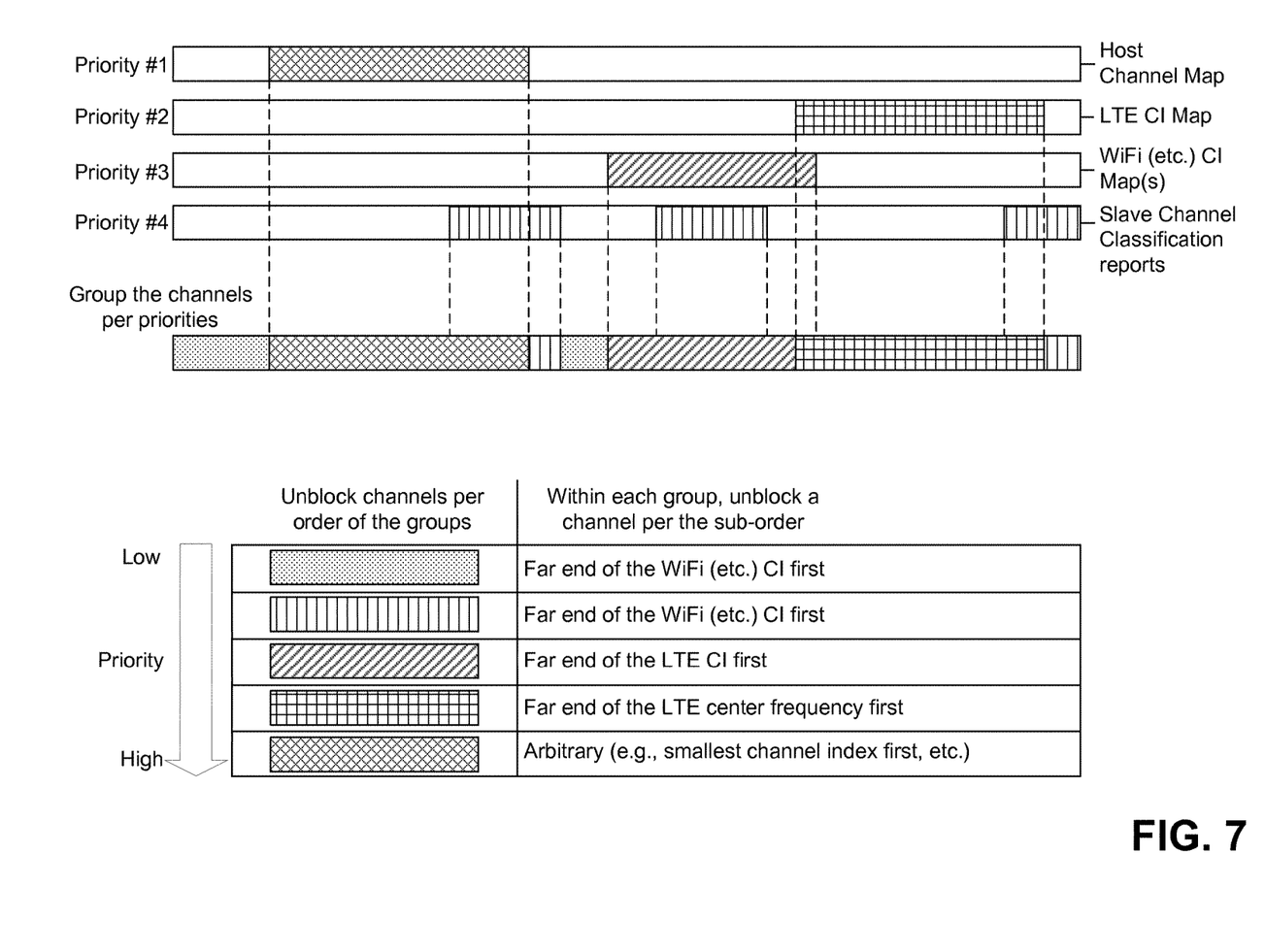
FIG. 7 is a diagram of an example scenario showing prioritization of 'UNUSED' channels based on various criteria, and additional factors within each priority level for selecting channels to unblock.

Referring to FIG. 7, illustrated is an example scenario showing prioritization of 'UNUSED' channels based on various criteria, and additional factors within each priority level for selecting channels to unblock. As can be seen in the upper portion of FIG. 7, different channels marked as 'UNUSED' can be assigned a priority based on the highest priority level among criteria that apply to that channel. The highest priority level, indicated via diagonal cross-hatching, applies to channels indicated in the host channel map. The second highest priority level, indicated via horizontal and vertical cross-hatching, applies to channels indicated in the LTE CI map. The third highest priority level, indicated via diagonal hatching, applies to channels indicated in CI map(s) for any collocated additional wireless components. The fourth highest priority level, indicated via vertical hatching, applies to channels indicated in received slave channel classification reports (e.g., which can indicated channels used by collocated additional wireless devices of the BT slaves). The fifth highest (lowest) priority level, indicated via shading, applies to channels marked 'UNUSED' based on local channel estimation (e.g., 'BAD' or 'UNKNOWN' channels). As indicated in the lower portion of FIG. 7, additional factors or rules can be applied in channel selection to preferentially select channels with less interference from collocated components (e.g., LTE, WiFi, etc.).

Figure 8:
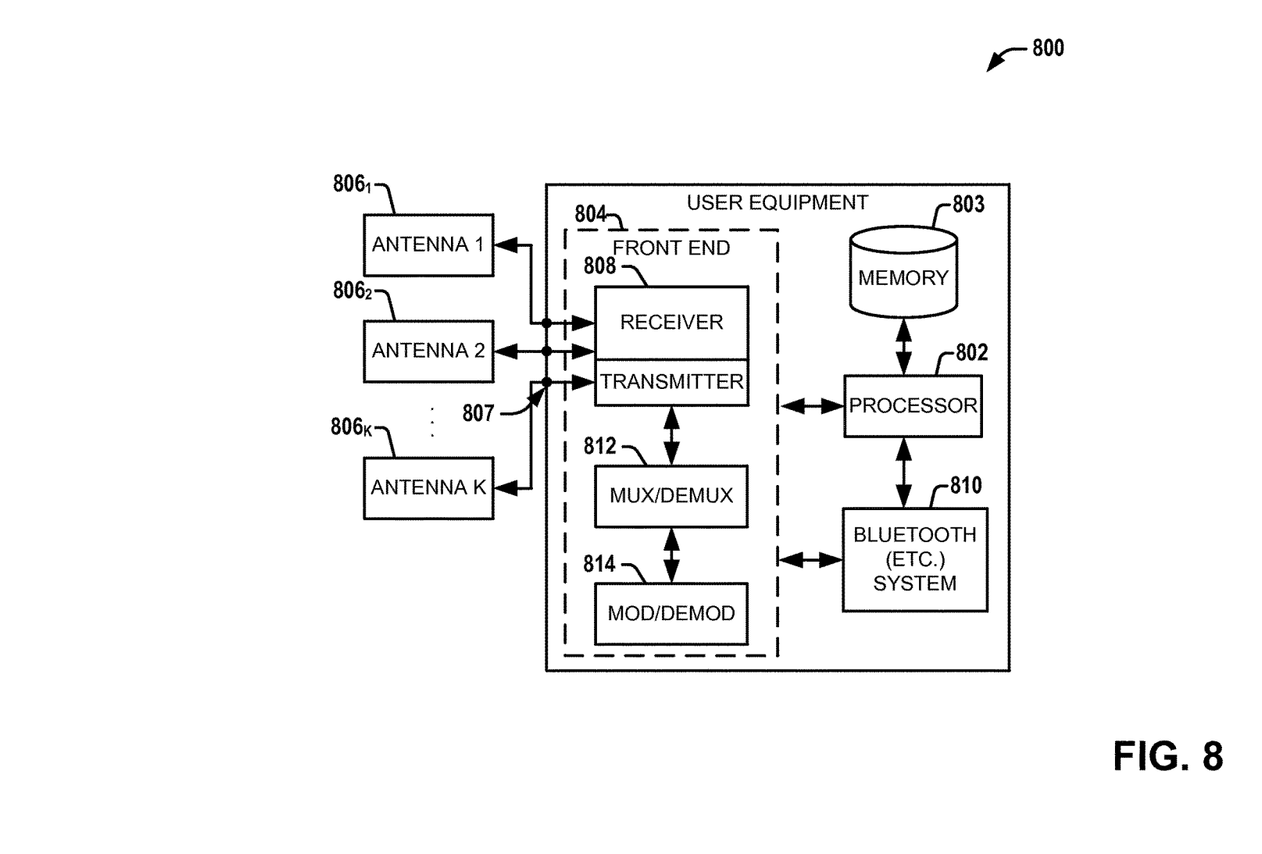
FIG. 8 is a block diagram illustrating an example UE useable in connection with various aspects described herein.

Referring to FIG. 8, illustrated is an exemplary user equipment or other Bluetooth-enabled communication device 800 that can be utilized with one or more aspects of the systems, methods, or devices that facilitate envelope tracking described herein according to various aspects. The user equipment 800, for example, comprises a digital baseband processor 802 that can be coupled to a data store or memory 803, a front end 804 (e.g., an RF front end, an acoustic front end, or the other like front end) and a plurality of antenna ports 807 for connecting to a plurality of antennas $806_1$ to $806_k$ (k being a positive integer). The antennas $806_1$ to $806_k$ can receive and transmit signals to and from one or more wireless devices such as access points, access terminals, wireless ports, routers and so forth, which can operate within a radio access network or other communication network generated via a network device. The user equipment 800 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 804 can include a communication platform, which comprises electronic components and associated circuitry that provide for processing, manipulation or shaping of the received or transmitted signals via one or more receivers or transmitters 808, a mux/demux component 812, and a mod/demod component 814. The front end 804, for example, is coupled to the digital baseband processor 802 and the set of antenna ports 807, in which the set of antennas $806_1$ to $806_k$ can be part of the front end. In one aspect, the user equipment 800 can comprise a BT system 810 that can facilitate communications with other BT-enabled devices. In various aspects, BT system 810 can comprise a BT slave component (which can be a BT master component configured to operate as a BT slave) or BT master component. In various aspects, BT system 810 can employ techniques described herein to minimize interference between BT transmissions and other wireless transmissions, especially from collocated wireless devices at user equipment 800 or at other BT devices in the same BT network (e.g., piconet, etc.).

The user equipment 800 can also include a processor 802 or a controller that can operate to provide or control one or more components of the user equipment 800. For example, the processor 802 can confer functionality, at least in part, to substantially any electronic component within the user equipment 800, in accordance with aspects of the disclosure. As an example associated with BT master embodiments, the processor can be configured to execute, at least in part, executable instructions that prioritize channel selection based at least in part on one or more of a host channel map, LTE channel inhibition (CI) map, WiFi or other wireless protocol (e.g., LTE, etc.) CI map, one or more slave channel classification reports, and local channel classifications. As an additional example associated with BT slave embodiments, the processor 800 can be configured to designate only channels associated with a WiFi (etc.) as BAD, such that those channels will have a reduced probability of selection by a BT master.

The processor 802 can operate to enable the mobile communication device 800 to process data (e.g., symbols, bits, or chips) for multiplexing/demultiplexing with the mux/demux component 812, or modulation/demodulation via the mod/demod component 814, such as implementing direct and inverse fast Fourier transforms, selection of modulation rates, selection of data packet formats, inter-packet times, etc. Memory 803 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

The processor 802 is functionally and/or communicatively coupled (e.g., through a memory bus) to memory 803 in order to store or retrieve information necessary to operate and confer functionality, at least in part, to communication platform or front end 804, the BT system 810 and substantially any other operational aspects of the BT system 810 or other communication systems, such as a collocated WiFi (etc.) system (not shown). While the components in FIG. 8 are illustrated in the context of a user equipment, such illustration is not limited to user equipment but also extends to other wireless communication devices, such as any BT-enabled device, a base station, small cell, femtocell, macro cell, microcell, etc.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is a system configured to be employed within a User Equipment (UE), comprising a Bluetooth (BT) component and a processor. The Bluetooth (BT) component is configured to operate in a BT master mode on a plurality of channels via an Adaptive Frequency Hopping (AFH) mode. The processor is configured to: assign, based on a set of criteria, a first status indicating that a channel is not used to one or more channels of the plurality of channels, and a second status indicating that the channel is used to each other channel of the plurality of channels; assign a priority level to each of the one or more channels based on the one or more criteria; identify whether a total number of channels set to the second status is less than a minimum number of required channels; and if the total number of channels assigned the second status is less than the minimum number, repeatedly assign the second status to a channel having a lowest priority level among channels with the first status, until the total number of channels set as the second status equals the minimum number.

Example 2 includes the subject matter of example 1, wherein the processor is further configured to perform channel estimation on the plurality of channels, wherein the set of criteria is based at least in part on results of the channel estimation.

Example 3 includes the subject matter of any of examples 1-2, including or omitting optional features, wherein the BT component receives one or more BT slave channel classification reports, and wherein the set of criteria is based at least in part on the one or more BT channel classification reports.

Example 4 includes the subject matter of any of examples 1-3, including or omitting optional features, further comprising an additional wireless component configured to operate on at least a subset of the plurality of channels, wherein the set of criteria is based at least in part on a channel inhibition (CI) map associated with the additional wireless component.

Example 5 includes the subject matter of any variation of example 4, including or omitting optional features, wherein at least one channel with the first status and the lowest priority level is assigned the second status based on a distance from channels listed in the CI map associated with the additional wireless component.

Example 6 includes the subject matter of any of examples 1-5, including or omitting optional features, further comprising a Long Term evolution (LTE) communication component configured to operate on at least a subset of the plurality of channels, wherein the set of criteria is based at least in part on a channel inhibition (CI) map associated with the LTE communication component.

Example 7 includes the subject matter of any variation of example 6, including or omitting optional features, wherein at least one channel with the first status and the lowest priority level is assigned the second status based on a distance from channels listed in the CI map associated with the LTE communication component.

Example 8 includes the subject matter of any variation of example 6, including or omitting optional features, wherein at least one channel with the first status and the lowest priority level is assigned the second status based on a distance from a center frequency of the CI map associated with the LTE communication component.

Example 9 includes the subject matter of any of examples 1-8, including or omitting optional features, wherein the set of criteria comprises a host channel map.

Example 10 includes the subject matter of any variation of example 9, including or omitting optional features, wherein at least one channel with the first status and the lowest priority level is assigned the second status based on a distance from a center frequency of the CI map associated with the LTE communication component.

Example 11 includes the subject matter of example 1, wherein the BT component receives one or more BT slave channel classification reports, and wherein the set of criteria is based at least in part on the one or more BT channel classification reports.

Example 12 includes the subject matter of example 1, further comprising an additional wireless component configured to operate on at least a subset of the plurality of channels, wherein the set of criteria is based at least in part on a channel inhibition (CI) map associated with the additional wireless component.

Example 13 includes the subject matter of example 12, wherein at least one channel with the first status and the lowest priority level is assigned the second status based on a distance from channels listed in the CI map associated with the additional wireless component.

Example 14 includes the subject matter of example 1, further comprising a Long Term evolution (LTE) communication component configured to operate on at least a subset of the plurality of channels, wherein the set of criteria is based at least in part on a channel inhibition (CI) map associated with the LTE communication component.

Example 15 includes the subject matter of example 14, wherein at least one channel with the first status and the lowest priority level is assigned the second status based on a distance from channels listed in the CI map associated with the LTE communication component.

Example 16 includes the subject matter of example 14, wherein at least one channel with the first status and the lowest priority level is assigned the second status based on a distance from a center frequency of the CI map associated with the LTE communication component.

Example 17 includes the subject matter of example 1, wherein the set of criteria comprises a host channel map.

Example 18 includes the subject matter of example 17, wherein at least one channel with the first status and the lowest priority level is assigned the second status based on a distance from a center frequency of the CI map associated with the LTE communication component.

Example 19 includes the subject matter of example 1, wherein the first status is an 'UNUSED' status and the second status is a 'USED' status.

Example 20 is a non-transitory machine readable medium comprising instructions that, when executed, cause a User Equipment (UE) to: set one or more channels of a plurality of channels associated with a Bluetooth (BT) component to a first status based on one or more criteria that comprise a local channel classification, one or more received classification reports, a Long Term Evolution (LTE) channel inhibition (CI) map, and a host channel map, wherein each criterion is associated with a priority level; for each channel of the plurality of channels not set to the first status, set that channel to a second status; for each channel set to the first status, assign it a highest priority level of the priority levels associated with the one or more criteria based on which that channel was set to the first status; determine whether a total number of channels set to the second status is less than a minimum number of required channels; and if the total number of channels set to the second status is less than the minimum number, sequentially set one or more channels with the first status and a lowest priority level among channels with the first status to the second status, until the total number of channels set to the second status is equal to the minimum number.

Example 21 includes the subject matter of example 20, wherein the host channel map is associated with a highest priority level.

Example 22 includes the subject matter of any of examples 20-21, including or omitting optional features, wherein the LTE CI map is associated with a second highest priority level.

Example 23 includes the subject matter of any of examples 20-22, including or omitting optional features, wherein at least one of the unblocked channels is selected based on a distance from a center frequency of the LTE CI map.

Example 24 includes the subject matter of any of examples 20-23, including or omitting optional features, wherein the one or more criteria comprise an additional wireless CI map received from an additional wireless component collocated with the BT component.

Example 25 includes the subject matter of example 20, wherein the LTE CI map is associated with a second highest priority level.

Example 26 includes the subject matter of example 20, wherein at least one of the unblocked channels is selected based on a distance from a center frequency of the LTE CI map.

Example 27 includes the subject matter of example 20, wherein the one or more criteria comprise an additional wireless CI map received from an additional wireless component collocated with the BT component.

Example 28 includes the subject matter of example 27, wherein the additional wireless CI map is associated with a third highest priority level.

Example 29 includes the subject matter of example 27, wherein at least one of the unblocked channels is selected based on a distance from one of a set of channels of the additional wireless CI map or a center frequency of the additional wireless CI map.

Example 30 includes the subject matter of example 20, wherein the one or more received classification reports are associated with a fourth highest classification level.

Example 31 includes the subject matter of example 20, wherein the local channel classification is associated with a fifth highest classification level.

Example 32 includes the subject matter of example 20, wherein the instructions, when executed, further cause the UE to perform a channel evaluation on each of the plurality of channels, wherein the local channel classification is based on the channel evaluation.

Example 33 includes the subject matter of example 20, wherein the channel evaluation is based on at least one of a Received Signal Strength Indicator (RSSI) and a Packet Error Rate (PER).

Example 34 includes the subject matter of example 20, wherein the first status is an 'UNUSED' status and the second status is a 'USED' status.

Example 35 is a system configured to be employed within a User Equipment (UE), comprising a Bluetooth (BT) component, an additional wireless component, and a processor. The Bluetooth (BT) component is configured to operate in a BT slave mode on a set of frequency bands via an Adaptive Frequency Hopping (AFH) mode. The additional wireless component is configured to operate on a first subset of the set of frequency bands and not to operate on a second subset of the set of frequency bands. The processor is configured to: assign a first channel estimate to each frequency band of the first subset; obtain a channel estimation result for each frequency band of the second subset based on a channel assessment; and for each frequency band of the second subset, assign one of a second or a third channel estimate based on the channel estimation result for that frequency band.

Example 36 includes the subject matter of example 35, wherein the processor being configured to, for each frequency band of the second subset, assign one of the second or the third channel estimate comprises the processor being configured to: for each frequency band of the second subset, assign the third channel estimate in response to the channel estimation result for that frequency band indicating either a poor channel quality or insufficient channel quality information; and for each frequency band of the second subset, assign the second channel estimate in response to the channel estimation result for that frequency band indicating sufficient channel quality and sufficient channel quality information.

Example 37 includes the subject matter of example 35, wherein the first channel estimate is a 'BAD' channel estimate, the second channel estimate is a 'GOOD' channel estimate, and the third channel estimate is an 'UNKNOWN' channel estimate.

Example 38 is a system configured to be employed within a User Equipment (UE), comprising means for communication and means for processing. The means for communication is configured to operate in a BT master mode on a plurality of channels via an Adaptive Frequency Hopping (AFH) mode. The means for processing is configured to: assign, based on a set of criteria, a first status indicating that a channel is not used to one or more channels of the plurality of channels, and a second status indicating that the channel is used to each other channel of the plurality of channels; assign a priority level to each of the one or more channels based on the one or more criteria; identify whether a total number of channels set to the second status is less than a minimum number of required channels; and if the total number of channels assigned the second status is less than the minimum number, repeatedly assign the second status to a channel having a lowest priority level among channels with the first status, until the total number of channels set as the second status equals the minimum number.

Example 39 is a system configured to be employed within a User Equipment (UE), comprising means for communication, additional means for communication, and means for processing. The means for communication is configured to operate in a BT slave mode on a set of frequency bands via an Adaptive Frequency Hopping (AFH) mode. The additional means for communication is configured to operate on a first subset of the set of frequency bands and not to operate on a second subset of the set of frequency bands. The means for processing is configured to: assign a first channel estimate to each frequency band of the first subset; obtain a channel estimation result for each frequency band of the second subset based on a channel assessment; and for each frequency band of the second subset, assign one of a second or a third channel estimate based on the channel estimation result for that frequency band.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A system configured to be employed within a User Equipment (UE), comprising:
   a Bluetooth (BT) component configured to operate in a BT master mode on a plurality of channels via an Adaptive Frequency Hopping (AFH) mode;
   a processor configured to:
      assign, based on a set of criteria, a first status indicating that a channel is not used to one or more channels of the plurality of channels, and a second status indicating that the channel is used to each other channel of the plurality of channels;
      assign a priority level to each of the one or more channels based on the one or more criteria;
      identify whether a total number of channels set to the second status is less than a minimum number of required channels; and
      if the total number of channels assigned the second status is less than the minimum number, repeatedly assign the second status to a channel having a lowest priority level among channels with the first status, until the total number of channels set as the second status equals the minimum number; and
   an additional wireless component configured to operate on at least a subset of the plurality of channels, wherein the set of criteria is based at least in part on a channel inhibition (CI) map associated with the additional wireless component.

2. The system of claim 1, wherein the processor is further configured to perform channel estimation on the plurality of channels, wherein the set of criteria is based at least in part on results of the channel estimation.

3. The system of claim 1, wherein the BT component receives one or more BT slave channel classification reports, and wherein the set of criteria is based at least in part on the one or more BT channel classification reports.

4. The system of claim 1, wherein at least one channel with the first status and the lowest priority level is assigned the second status based on a distance from channels listed in the CI map associated with the additional wireless component.

5. The system of claim 1, further comprising a Long Term evolution (LTE) communication component configured to operate on at least a subset of the plurality of channels, wherein the set of criteria is based at least in part on a channel inhibition (CI) map associated with the LTE communication component.

6. The system of claim 5, wherein at least one channel with the first status and the lowest priority level is assigned the second status based on a distance from channels listed in the CI map associated with the LTE communication component.

7. The system of claim 5, wherein at least one channel with the first status and the lowest priority level is assigned the second status based on a distance from a center frequency of the CI map associated with the LTE communication component.

8. The system of claim 1, wherein the set of criteria comprises a host channel map.

9. The system of claim 8, wherein at least one channel with the first status and the lowest priority level is assigned the second status based on a distance from a center frequency of the CI map associated with the LTE communication component.

10. The system of claim 1, wherein the first status is an 'UNUSED' status and the second status is a 'USED' status.

11. A non-transitory machine readable medium comprising instructions that, when executed, cause a User Equipment (UE) to:
  set one or more channels of a plurality of channels associated with a Bluetooth (BT) component to a first status based on one or more criteria that comprise a local channel classification, one or more received classification reports, a Long Term Evolution (LTE) channel inhibition (CI) map, and a host channel map, wherein each criterion is associated with a priority level;
  for each channel of the plurality of channels not set to the first status, set that channel to a second status;
  for each channel set to the first status, assign it a highest priority level of the priority levels associated with the one or more criteria based on which that channel was set to the first status;
  determine whether a total number of channels set to the second status is less than a minimum number of required channels; and
  if the total number of channels set to the second status is less than the minimum number, sequentially set one or more channels with the first status and a lowest priority level among channels with the first status to the second status, until the total number of channels set to the second status is equal to the minimum number,
  wherein the LTE CI map is associated with a second highest priority level.

12. The non-transitory machine readable medium of claim 11, wherein the host channel map is associated with a highest priority level.

13. The non-transitory machine readable medium of claim 11, wherein at least one of the unblocked channels is selected based on a distance from a center frequency of the LTE CI map.

14. The non-transitory machine readable medium of claim 11, wherein the one or more criteria comprise an additional wireless CI map received from an additional wireless component collocated with the BT component.

15. The non-transitory machine readable medium of claim 14, wherein the additional wireless CI map is associated with a third highest priority level.

16. The non-transitory machine readable medium of claim 14, wherein at least one of the unblocked channels is selected based on a distance from one of a set of channels of the additional wireless CI map or a center frequency of the additional wireless CI map.

17. The non-transitory machine readable medium of claim 11, wherein the one or more received classification reports are associated with a fourth highest classification level.

18. The non-transitory machine readable medium of claim 11, wherein the local channel classification is associated with a fifth highest classification level.

19. The non-transitory machine readable medium of claim 11, wherein the instructions, when executed, further cause the UE to perform a channel evaluation on each of the plurality of channels, wherein the local channel classification is based on the channel evaluation.

20. The non-transitory machine readable medium of claim 11, wherein the channel evaluation is based on at least one of a Received Signal Strength Indicator (RSSI) and a Packet Error Rate (PER).

* * * * *